(12) United States Patent
Lin et al.

(10) Patent No.: US 12,177,570 B2
(45) Date of Patent: Dec. 24, 2024

(54) DRIVING MEANS FOR CAMERA

(71) Applicant: Lanto Electronic Limited, Kunshan (CN)

(72) Inventors: Yu-Cheng Lin, Taipei (TW); Fu-Yuan Wu, Taipei (TW); Shang-Yu Hsu, Taipei (TW); Meng-Ting Lin, Taipei (TW)

(73) Assignee: Lanto Electronic Limited, Kunshan (CN)

( * ) Notice: Subject to any disclaimer, the term of this patent is extended or adjusted under 35 U.S.C. 154(b) by 19 days.

(21) Appl. No.: 17/992,092

(22) Filed: Nov. 22, 2022

(65) Prior Publication Data

US 2023/0164440 A1 May 25, 2023

(30) Foreign Application Priority Data

Nov. 22, 2021 (CN) .......................... 202111382659.4

(51) Int. Cl.
*H04N 23/68* (2023.01)
*H04N 23/51* (2023.01)
*H04N 23/55* (2023.01)

(52) U.S. Cl.
CPC ........... *H04N 23/687* (2023.01); *H04N 23/51* (2023.01); *H04N 23/55* (2023.01)

(58) Field of Classification Search
CPC ...... H04N 23/687; H04N 23/51; H04N 23/55; H04N 23/57; H04N 23/54; H04N 23/50; G02B 27/646
See application file for complete search history.

(56) References Cited

U.S. PATENT DOCUMENTS

| 10,663,689 B2 | 5/2020 | Lee et al. | |
|---|---|---|---|
| 2012/0099201 A1* | 4/2012 | Chan | G03B 17/00 |
| | | | 359/557 |
| 2012/0105986 A1* | 5/2012 | Wu | G02B 7/08 |
| | | | 359/823 |
| 2012/0218650 A1* | 8/2012 | Hu | G02B 7/102 |
| | | | 310/12.31 |

(Continued)

FOREIGN PATENT DOCUMENTS

| CN | 204442143 U | 7/2015 |
|---|---|---|
| CN | 105573014 A | 5/2016 |

(Continued)

*Primary Examiner* — Padma Haliyur
(74) *Attorney, Agent, or Firm* — Birch, Stewart, Kolasch & Birch, LLP

(57) ABSTRACT

A camera assembly comprising a casing, a carrying component, a magnetic component, a light sensing component, and a carrying board. The casing comprises a lens accommodating groove, a housing, and a base on which the housing is disposed. The lens accommodating groove is disposed between the housing and the base. An opening of the lens accommodating groove is disposed at the housing. The carrying component comprises a carrying body and a first coil disposed on a periphery of the carrying body. The carrying component is assembled in the lens accommodating groove. The magnetic component is disposed on a periphery of the first coil and on an inner wall of the lens accommodating groove. The light sensing component comprises a light sensing member, a baseplate, and a second coil.

17 Claims, 12 Drawing Sheets

(56) References Cited

U.S. PATENT DOCUMENTS

| | | | | |
|---|---|---|---|---|
| 2013/0215511 A1* | 8/2013 | Wu | ...................... | H04N 23/687 |
| | | | | 359/554 |
| 2016/0054578 A1* | 2/2016 | Dong | ................... | G02B 27/646 |
| | | | | 359/557 |
| 2020/0073083 A1 | 3/2020 | Lee | | |
| 2021/0215945 A1* | 7/2021 | Rho | ...................... | G06F 1/1626 |
| 2021/0318592 A1 | 10/2021 | Kim et al. | | |
| 2022/0006935 A1 | 1/2022 | Du et al. | | |
| 2023/0418086 A1* | 12/2023 | Wang | ................... | H04N 23/687 |

FOREIGN PATENT DOCUMENTS

| | | | | |
|---|---|---|---|---|
| CN | 107277307 A | 10/2017 | | |
| CN | 207782987 U | 8/2018 | | |
| CN | 110058378 A | 7/2019 | | |
| CN | 110780509 A | 2/2020 | | |
| CN | 210038296 U | 2/2020 | | |
| CN | 111381342 A | 7/2020 | | |
| CN | 210982884 U | 7/2020 | | |
| CN | 112650001 A | 4/2021 | | |
| CN | 112770060 A | 5/2021 | | |
| CN | 112804415 A | 5/2021 | | |
| CN | 112886788 A * | 6/2021 | ........... | G02B 13/009 |
| CN | 113242375 A | 8/2021 | | |
| CN | 113433760 A | 9/2021 | | |
| TW | I490630 B | 7/2015 | | |
| TW | I578093 B | 4/2017 | | |
| TW | I579629 B | 4/2017 | | |
| TW | I624706 B | 5/2018 | | |
| TW | 202111367 A | 3/2021 | | |
| TW | M620036 U | 11/2021 | | |
| WO | WO 2018/219324 A1 | 12/2018 | | |
| WO | WO-2022188657 A1 * | 9/2022 | ........... | G02B 13/009 |

\* cited by examiner

DRIVING MEANS FOR CAMERA

CROSS-REFERENCE TO RELATED APPLICATION

This application claims the priority benefit of Chinese Patent Application Serial Number 202111382659.4, filed on Nov. 22, 2021, the full disclosure of which is incorporated herein by reference.

BACKGROUND

Technical Field

The present disclosure relates to the technical field of camera assembly, particularly to a camera assembly designed to equip with a voice coil motor with an optical image stabilized sensor.

Related Art

Cameras nowadays are often equipped with image stabilization mechanisms, particularly the optical image stabilization technology, to compensate for low light situation for capturing a clear image with excellent image quality to avoid unclear outcomes due to unstable shooters' hands while hand-held shooting with cameras. Conventional image stabilization of a sensor of a camera is equipped with a spring component and meanwhile, this camera assembly can be combined with metal wiring technology to realize a configuration that extends out the circuit of the floating sensor. However, the disadvantage is the exceeding cost, poor horizontal-only image stabilization without any effect in the vertical direction (roll).

SUMMARY

The embodiments of the present disclosure provide a camera device tended to solve the problem of poor image stabilization and the exceeding cost of conventional camera devices through a design of combining a driving mechanism for focusing system with a driving mechanism for optical image stabilization system.

The present disclosure provides a camera assembly comprising a casing, a carrying component, a magnetic component, a light sensing component, and a carrying board. The casing comprises a lens accommodating groove, a housing, and a base on which the housing is disposed. The lens accommodating groove is disposed between the housing and the base. An opening of the lens accommodating groove is disposed at the housing. The carrying component comprises a carrying body and a first coil disposed on a periphery of the carrying body. The carrying component is assembled in the lens accommodating groove. The magnetic component is disposed on a periphery of the first coil and on an inner wall of the lens accommodating groove. The light sensing component comprises a light sensing member, a baseplate, and a second coil. The light sensing member is disposed on the baseplate. The second coil is disposed around the light sensing member and below the magnetic component. The carrying board is disposed under the light sensing component and is slidably disposed on the base.

In one embodiment, the number of the second coils is multiple. The plurality of second coils comprise a first direction coil group and a second direction coil group. The first direction coil group is disposed at two opposite sides of the light sensing member. The second direction coil group is disposed at the other two opposite sides of the light sensing member.

In one embodiment, the magnetic component comprises a first direction magnet group and a second direction magnet group. The first direction magnet group is disposed above the first direction coil group. The second direction magnet group is disposed above the second direction coil group.

In one embodiment, the first direction coil group comprises a plurality of first side coils and a plurality of second side coils. The plurality of first side coils are disposed on a side of the light sensing member. The plurality of second side coils are disposed on another side of the light sensing member opposite to the side where the plurality of first side coils are disposed.

In one embodiment, the magnetic component comprises a first direction magnet group and a second direction magnet group. The first direction magnet group comprises a plurality of first side magnets and a plurality of second side magnets. The plurality of first side magnets are respectively disposed above the plurality of first side coils. The plurality of second side magnets are respectively disposed above the plurality of second side coils. The second direction magnet group is disposed above the second direction coil group.

In one embodiment, the base comprises a plurality of recesses and a plurality of balls slidably disposed in the plurality of recesses. A bottom surface of the carrying board is in contact with the plurality of balls.

In one embodiment, the bottom surface of the carrying board comprises a plurality of bumps extended into the plurality of recesses. The thickness of each of the bumps is smaller than the depth of each of the recesses. An outer diameter of each of the bumps is smaller than a diameter of an opening of each of the recesses. The plurality of balls are respectively disposed between the recesses and the bumps corresponding to the recesses.

In one embodiment, the camera assembly comprises a plurality of first magnetic members and a plurality of second magnetic members. The plurality of first magnetic members are disposed on the base. The plurality of second magnetic members are disposed on the carrying board in a position corresponding to the positions of the plurality of first magnetic members. The plurality of first magnetic members and the plurality of second magnetic members are mutually attracted.

In one embodiment, the camera assembly comprises a flexible circuit board. The flexible circuit board comprises a first end part, a second end part, and a body part disposed between the first end part and the second end part. The first end part is connected to a side of the baseplate. The body part surrounds a periphery of the light sensing component. The second end part is disposed at one side of the light sensing component.

In one embodiment, the number of the flexible circuit boards is two. The first end parts of the two flexible circuit boards are connected to two opposite sides of the baseplate. When the body parts of the two flexible circuit boards extend vertically upward relative to a surface of the baseplate, they would be extendingly disposed in opposite directions along the periphery of the light sensing component. The body parts of the two flexible circuit boards are disposed at the periphery of the light sensing component and are connected to the second end parts.

In one embodiment, the number of the flexible circuit boards is two. The first end parts of the two flexible circuit boards are connected to the same side of the baseplate. When the body parts of the two flexible circuit boards extend vertically upward relative to a surface of the baseplate, they would be extendingly disposed in opposite directions along the periphery of the light sensing component and would be connected to the second end parts.

In one embodiment, the first end part of the flexible circuit board is disposed parallel to the surface of the baseplate. The body part and the second end part of the flexible circuit board are disposed vertical to the surface of the baseplate.

In one embodiment, the camera assembly comprises a lens component. The lens component is assembled to the carrying body and is disposed in the lens accommodating groove.

In one embodiment, the casing comprises a holder disposed at an inner side of the housing. The magnetic component is disposed at the support. The holder surrounds the carrying component.

In one embodiment, the camera assembly comprises a first spring member and second spring member. An upper surface of the holder comprises an accommodating recess. A circumference of a lower surface of the holder comprises a securing column. The first spring member is disposed in the accommodating recess of the support. An inner side of the first spring member abuts against a top part of the carrying body. The first spring member is disposed between the holder and the housing. The second spring member is disposed at the securing column of the holder. An inner side of the second spring member supports a bottom side of the carrying body. The second spring member is disposed around the light sensing member.

In the embodiments of the present disclosure, by providing a camera assembly designed with a combination of a driving mechanism for focusing system with a driving mechanism for optical image stabilization system, the first coil of the carrying component and the second coil of the light sensing component could jointly correspond to the magnetic field of the magnetic component, so as to minimize the volume of the device by reducing the space occupied in the casing, and also to reduce the total cost.

It should be understood, however, that this summary may not contain all aspects and embodiments of the present disclosure, that this summary is not meant to be limiting or restrictive in any manner, and that the disclosure as disclosed herein will be understood by one of ordinary skill in the art to encompass obvious improvements and modifications thereto.

BRIEF DESCRIPTION OF THE DRAWINGS

The features of the exemplary embodiments believed to be novel and the elements and/or the steps characteristic of the exemplary embodiments are set forth with particularity in the appended claims. The Figures are for illustration purposes only and are not drawn to scale. The exemplary embodiments, both as to organization and method of operation, may best be understood by reference to the detailed description which follows taken in conjunction with the accompanying drawings in which:

DETAILED DESCRIPTION OF THE EMBODIMENTS

The present disclosure will now be described more fully hereinafter with reference to the accompanying drawings, in which exemplary embodiments of the disclosure are shown. This present disclosure may, however, be embodied in many different forms and should not be construed as limited to the embodiments set forth herein. Rather, these embodiments are provided so that this present disclosure will be thorough and complete, and will fully convey the scope of the present disclosure to those skilled in the art.

Certain terms are used throughout the description and following claims to refer to particular components. As one skilled in the art will appreciate, manufacturers may refer to a component by different names. This document does not intend to distinguish between components that differ in name but function. In the following description and in the claims, the terms "include/including" and "comprise/comprising" are used in an open-ended fashion, and thus should be interpreted as "including but not limited to". "Substantial/substantially" means, within an acceptable error range, the person skilled in the art may solve the technical problem in a certain error range to achieve the basic technical effect.

The following description is of the best-contemplated mode of carrying out the disclosure. This description is made for the purpose of illustration of the general principles of the disclosure and should not be taken in a limiting sense. The scope of the disclosure is best determined by reference to the appended claims.

Moreover, the terms "include", "contain", and any variation thereof are intended to cover a non-exclusive inclusion. Therefore, a process, method, object, or device that includes a series of elements not only includes these elements, but also includes other elements not specified expressly, or may include inherent elements of the process, method, object, or device. If no more limitations are made, an element limited by "include a/an . . . " does not exclude other same elements existing in the process, the method, the article, or the device which includes the element.

Figure 1:
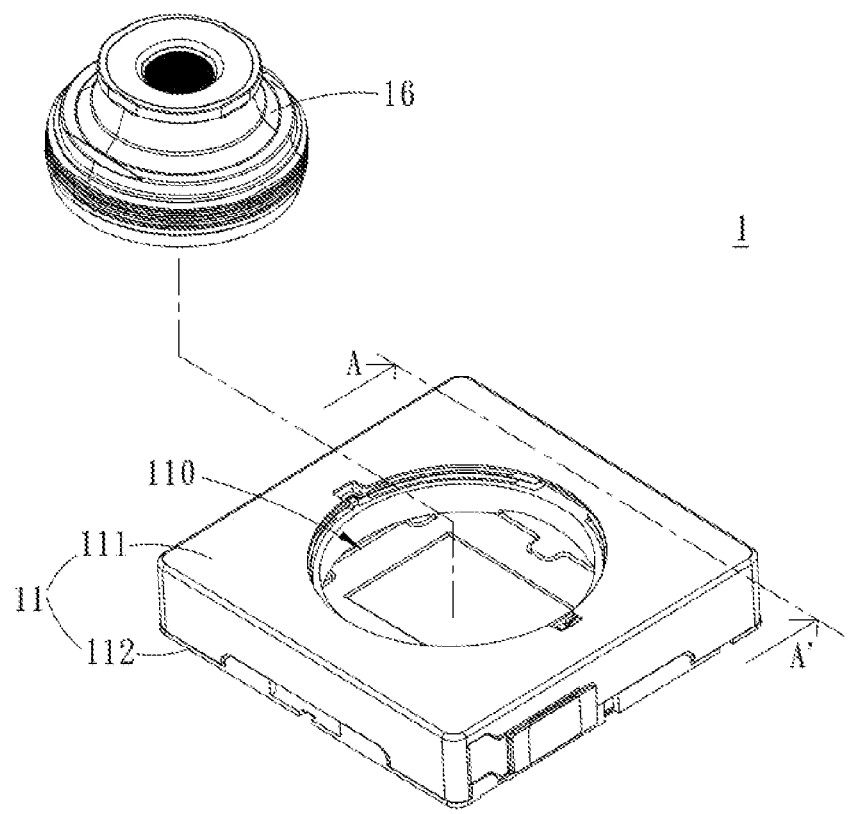
FIG. 1 is an exploded view of a lens component of a camera assembly of the present disclosure.
Figure 2:
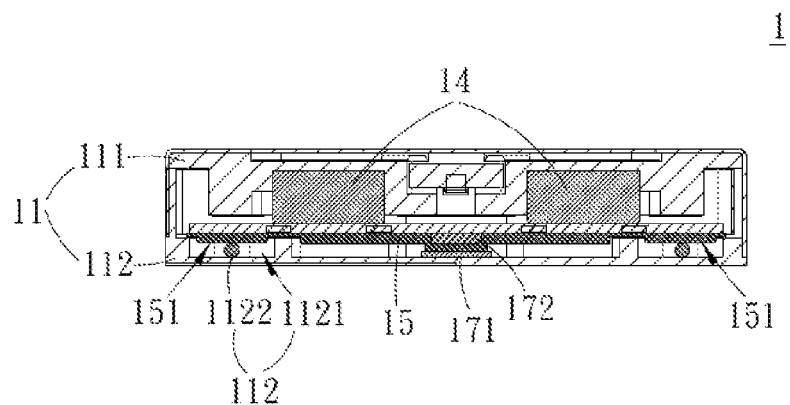
FIG. 2 is a cross-sectional view along line A-A' of FIG. 1.
Figure 3:
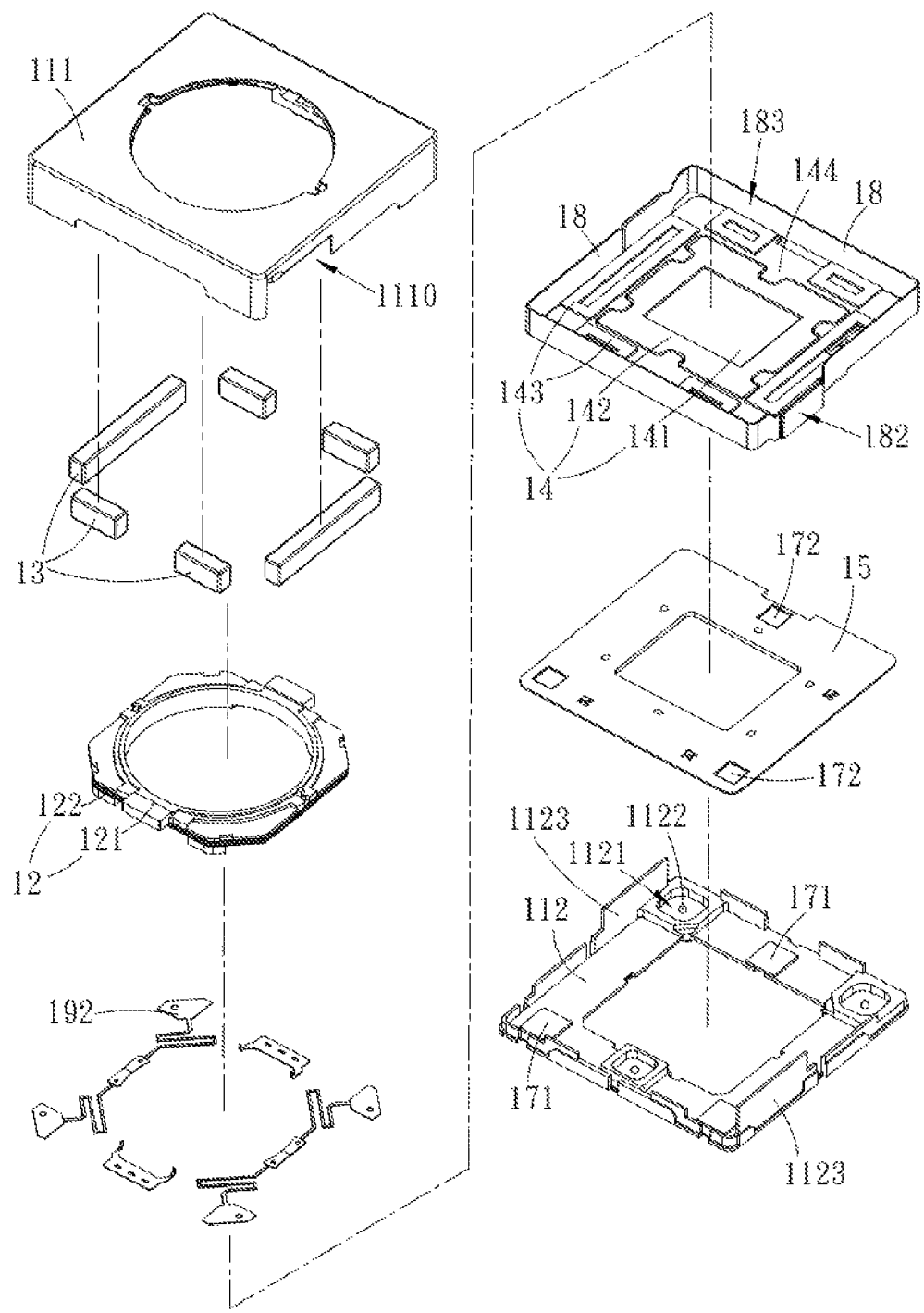
FIG. 3 is an exploded view of the camera assembly of the present disclosure.
Figure 4:
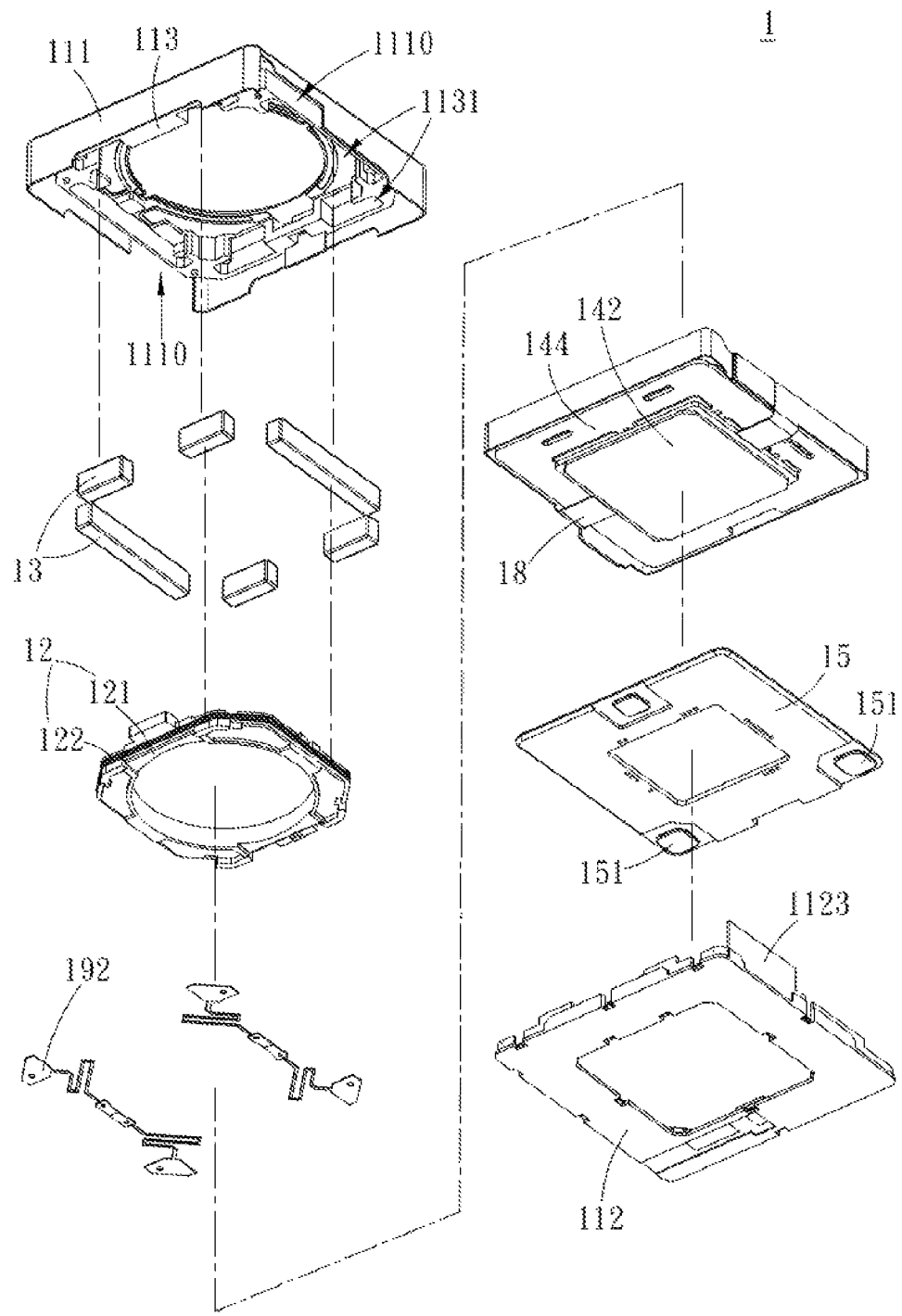
FIG. 4 is another exploded view of the camera assembly of the present disclosure.

FIG. 1 is an exploded view of a lens component of a camera assembly of the present disclosure. FIG. 2 is a cross-sectional view along line A-A' of FIG. 1. FIG. 3 is an exploded view of the camera assembly of the present disclosure. FIG. 4 is another exploded view of the camera assembly of the present disclosure. As shown in the figures, the present disclosure provides a camera assembly 1, which comprises a casing 11, a carrying component 12, a magnetic component 13, a light sensing component 14, and a carrying board 15. The casing 11 comprises a lens accommodating groove 110, a housing 111, and a base 112. The housing 111 is disposed on the base 112, the lens accommodating groove 110 is disposed between the housing 111 and the base 112, and an opening of the lens accommodating groove 110 is disposed at the housing 111. The carrying component 12 comprises a carrying body 121 and a first coil 122, the first coil 122 is disposed on the periphery of the carrying body 121, and the carrying component 12 is assembled in the lens accommodating groove 110. The magnetic component 13 is disposed on the periphery of the first coil 122, and the magnetic component 13 is disposed on an inner wall of the lens accommodating groove 110. The light sensing component 14 comprises a light sensing member 141, a baseplate 142, and a second coil 143. The light sensing member 141 is disposed at the baseplate 142 and is correspondingly disposed at the bottom of the lens accommodating groove 110. The second coil 143 is disposed around the light sensing member 141 and below the magnetic component 13. The carrying board 15 is disposed under the light sensing component 14 and is disposed on the base 112. Wherein, the camera assembly 1 further comprises a lens component 16. The lens component 16 is assembled on the carrying body 121 and is disposed in the lens accommodating groove 110.

The base 112 comprises a plurality of recesses 1121 and a plurality of balls 1122 slidably disposed in the plurality of recesses 1121. A bottom surface of the carrying board 15 is in contact with the plurality of balls 1122. Wherein, the bottom surface of the carrying board 15 further comprises a plurality of bumps 151 extended into the plurality of recesses 1121. The thickness of each of the bumps 151 is smaller than the depth of each of the recesses 1121, and the outer diameter of each of the bumps 151 is smaller than the diameter of an opening of each of the recesses 1121. The plurality of balls 1122 are respectively disposed between the recesses 1121 and the bumps 151 corresponding to the recesses 1121. In this way, when the bump 151 is in the recess 1121, the bump 151 could be displaced and rotating in the recess 1121. Meanwhile, the displacement and rotation range of the bump 151 are also limited by the opening of the recess 1121.

Besides, the camera assembly 1 further comprises a plurality of first magnetic members 171 and a plurality of second magnetic members 172. The plurality of first magnetic members 171 are disposed on the base 112. The plurality of second magnetic members 172 are disposed on the carrying board 15 in a position corresponding to the positions of the first magnetic members 171. The plurality of first magnetic members 171 and the plurality of second magnetic members 172 are mutually attracted. In this way, when the plurality of bumps 151 of the carrying board 15 are sliding on the balls 1122 of the base 112, the bumps 151 of the carrying board 15 may be stably against the plurality of balls 1122 during sliding, and prevent the carrying board 15 from being separated from the base 112. In some embodiments, the first magnetic member 171 is a magnetic conductive sheet, and the second magnetic member 172 is a magnet. Regarding the first magnetic member 171 and the second magnetic member 172, the arrangement of the magnet and the magnetic conductive sheet can be decided according to requirements.

Figure 5:
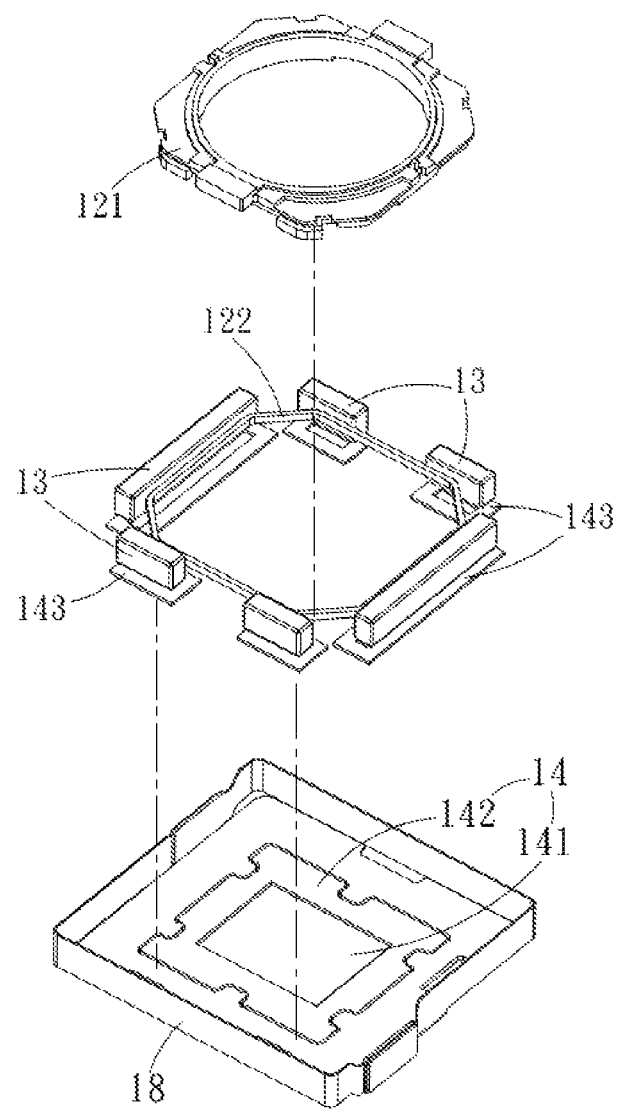
FIG. 5 is a perspective view of a driving mechanism of a camera assembly of the first embodiment of the present disclosure.
Figure 6:
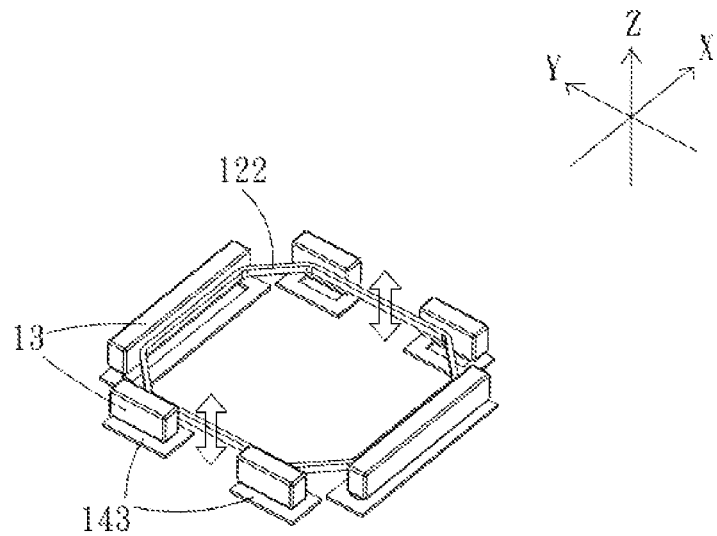
FIG. 6 is a schematic diagram of the driving direction of the driving mechanism of the present disclosure.
Figure 7:
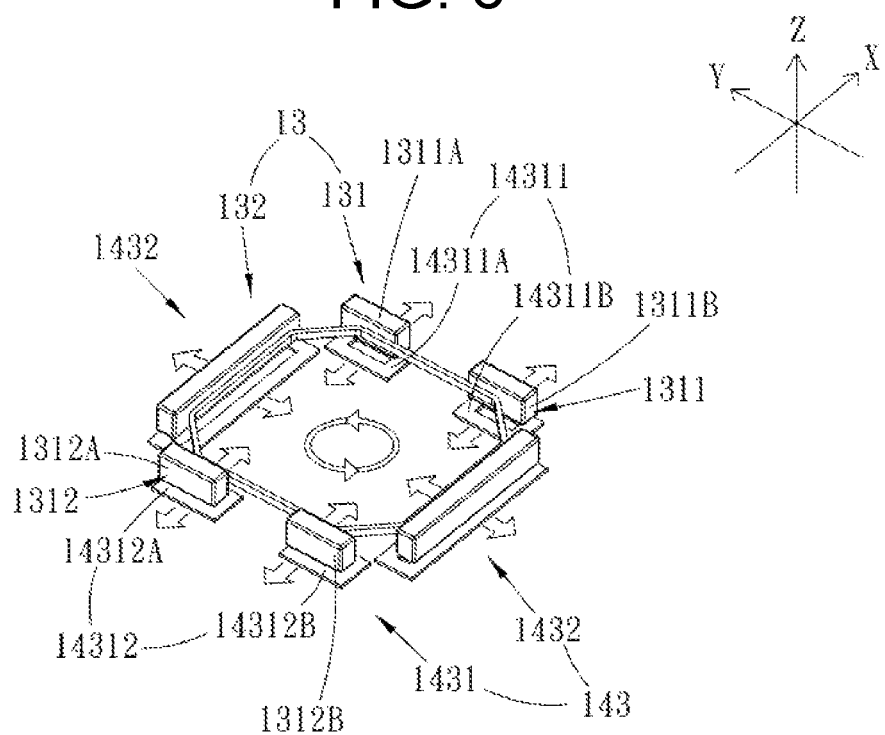
FIG. 7 is another schematic diagram of the driving direction of the driving mechanism of the present disclosure.

FIG. 5 is a perspective view of a driving mechanism of a camera assembly of the first embodiment of the present disclosure. FIG. 6 and FIG. 7 are schematic diagrams of the driving direction of the driving mechanism of the present disclosure. As shown in the figures, in this embodiment, the first coil 122 is disposed on the periphery of the carrying body 121. When applying an electric current to the first coil 122, the first coil 122 would generate a magnetic force relative to the magnetic component 13 so that the first coil 122 would drive the carrying body 121 to displace.

Besides, in this embodiment, the number of the second coils 143 is multiple. The plurality of second coils 143 are disposed around the light sensing member 141. When an electric current is applied to the plurality of second coils 143, the plurality of second coils 143 would generate a magnetic force against the magnetic component 13 so that the plurality of second coils 143 could drive the light sensing component 14 to horizontally displace or rotate. Moreover, the carrying board 15 is disposed under the light sensing component 14, and the bottom surface of the carrying board 15 is in contact with the plurality of balls 1122. The bottom surface of the carrying board 15 and a surface of the base 112 would not be affected by any friction so that the carrying board 15 will not affect the horizontal displacement or rotation of the light sensing component 14.

Referring to FIG. 7 again, in this embodiment, the light sensing component 14 further comprises a coil board member 144. The plurality of second coils 143 could be firstly disposed on or embedded in the coil board member 144, and since the coil board member 144 is annular shaped, the coil board member 144 could facilitate the plurality of second coils 143 to be disposed around the light sensing member 141. Also, the coil board member 144 can secure the plurality of second coils 143 at outer positions relative to the light sensing member 141. In this way, the plurality of second coils 143 could be disposed on the outer side of the light sensing member 141, which is beneficial to the assembling process for the camera assembly 1.

Moreover, the plurality of second coils 143 comprise a first direction coil group 1431 and a second direction coil group 1432. The first direction coil group 1431 is disposed on two opposite sides of the light sensing member 141, and the second direction coil group 1432 is disposed on the other two opposite sides of the light sensing member 141. The magnetic component 13 comprises a first direction magnet group 131 and a second direction magnet group 132. The first direction magnet group 131 is disposed above the first direction coil group 1431, and the second direction magnet group 132 is disposed above the second direction coil group 1432. Wherein, the first direction coil group 1431 further comprises a plurality of first side coils 14311 and a plurality of second side coils 14312. The plurality of first side coils 14311 are disposed on a side of the light sensing member 141, and the plurality of second side coils 14312 are disposed on another side of the light sensing member 141 opposite to the side where the plurality of first side coils 14311 are disposed. Furthermore, the first direction magnet group 131 comprises a plurality of first side magnets 1311 and a plurality of second side magnets 1312. The plurality of first side magnets 1311 are respectively disposed above the plurality of first side coils 14311, and the plurality of second side magnets 1312 are respectively disposed above the plurality of second side coils 14312.

Referring to FIG. 6 again, three axial directions of X, Y, and Z are marked on the drawing to facilitate the description of the driving direction of the driving mechanism. When a corresponding magnetic field is generated as the first coil 122 is applied with an electric current, the magnetic field generated by the first coil 122 would produce an attractive force or a repulsive force on the permanent magnetic field of the magnetic component 13, where the intensity of the attractive force and the repulsive force are controlled by the first coil 122 through electric current intensity. The carrying body 121 is driven by the first coil 122 to move back and forth in a vertical direction (i.e., displacement in Z-axis). The lens component 16 is assembled on the carrying body 121. The carrying body 121 can move closer to or away from the light sensing component 14 to adjust the distance between the lens component 16 and the light sensing member 141 for the completion of the focusing mechanism.

Referring to FIG. 7 again, in this embodiment, three axial directions of X, Y, and Z are marked on the drawing to facilitate the description of the driving direction of the driving mechanism. When an electric current is applied to the second coil 143 to generate a corresponding magnetic field, the magnetic field generated by the second coil 143 would produce an attractive force or a repulsive force to the permanent magnetic field of the magnetic component 13, where the intensity of the attractive force and the repulsive force are controlled by the second coil 143 through electric current intensity. The light sensing component 14 is driven by the second coil 143 to horizontally displace or rotate. Wherein, the first direction coil group 1431 of the second coil 143 could generate an attractive force or a repulsive force in a first direction (i.e., the X-axis direction) relative to the first direction magnet group 131 of the magnetic component 13. The first direction coil group 1431 could drive the light sensing component 14 to move back and forth in the first direction (i.e., the X-axis direction). Moreover, the second direction coil group 1432 of the second coil 143 could generate an attractive force or a repulsive force in a second direction (i.e., the Y-axis direction) relative to the second direction magnet group 132 of the magnetic component 13. The second direction coil group 1432 could drive the light sensing component 14 to move back and forth in the second direction (i.e., the Y-axis direction). The displacement of the lens component 16 of this embodiment could be adjusted along the vertical direction, the first direction, and the second direction which are the three axial directions of the X, Y, and Z-axis.

Furthermore, the first direction coil group 1431 further comprises a plurality of first side coils 14311 and a plurality of second side coils 14312. The number of the plurality of first side coils 14311 is two, and the number of the plurality of first side coils 14311 is two. The plurality of first side coils 14311 are arranged side by side along a side of the light sensing component 14, and meanwhile, the plurality of first side coils 14311 correspond to the plurality of first side magnets 1311 of the first direction magnet group 131. The number of second side coils 14312 is two, and the number of second side magnets 1312 is two. The plurality of second side coils 14312 are arranged side by side along another side of the light sensing component 14, and meanwhile, the plurality of second side coils 14312 correspond to the plurality of second side magnets 1312 of the first direction magnet group 131. In this embodiment, by applying an electric current in the same direction to a plurality of first side coils 14311 and a plurality of second side coils 14312, the plurality of first side coils 14311 and the plurality of second side coils 14312 could generate an attractive force or repulsion force in the first direction (i.e., the X-axis direction) relative to the magnetic component 13.

In this embodiment, the two first side coils 14311 comprise two coils 14311A and 14311B. The two second side coils 14312 comprise two coils 14312A and 14312B. The two first side magnets 1311 comprise two magnets 1311A and 1311B. The two second side magnets 1312 comprise two magnets 1312A and 1312B. The first side coil 14311A and the second side coil 14312A are oppositely disposed, and the first side coil 14311B and the second side coil 14312B are oppositely disposed. An electric current in the same direction is applied to the first side coil 14311A and the second side coil 14312A so that the first side coil 14311A would be positively displaced in the first direction X relative to the first side magnet 1311A. The second side coil 14312A could be positively displaced in the first direction X relative to the second side magnet 1312A, that is, to be displaced in a direction from the second side coil 14312A toward the first side coil 14311A.

Besides, the first side coil 14311B and the second side coil 14312B also applied with an electric current in the same direction so that the first side coil 14311B can be negatively displaced in the first direction X relative to the first side magnet 1311B. The second side coil 14312B is negatively displaced in the first direction X relative to the second side magnet 1312B, that is, to be displaced in the direction from the first side coil 14311B to the second side coil 14312B. In this way, the light sensing component 14 close to one side of the first side coil 14311A and the second side coil 14312A would be driven to displace in the direction from the second side coil 14312A toward the first side coil 14311A. The light sensing component 14 close to one side of the first side coil 14311B and the second side coil 14312B would be driven to displace in the direction from the first side coil 14311B toward the second side coil 14312B, thereby driving the light sensing component 14 to displace in a clockwise direction. On the contrary, an electric current in a reverse direction can also be applied to cause the light sensing component 14 to displace in a counterclockwise direction.

Figure 8:
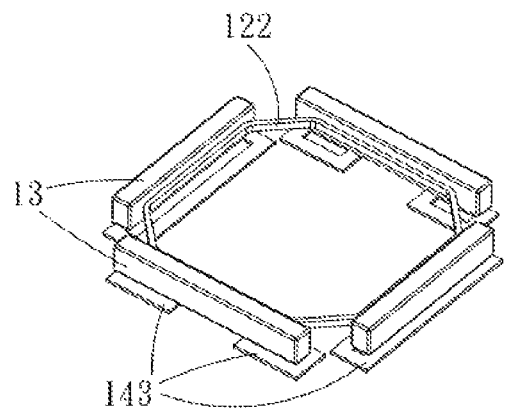
FIG. 8 is a perspective view of a driving mechanism of a camera assembly of the second embodiment of the present disclosure.

FIG. 8 is a perspective view of a driving mechanism of a camera assembly of the second embodiment of the present disclosure. As shown in the figure, the difference between this embodiment and the first embodiment of the driving mechanism lies in the magnetic component 13. In this embodiment, the magnetic components 13 are four permanent magnets, which are disposed around the first coil 122. Meanwhile, the magnetic component 13 is disposed above the second coil 143. This embodiment does not limit the number of the magnetic components 13 to four permanent magnets, which could also be correspondingly configured according to the number of coils. Referring to FIG. 7 again, four permanent magnets respectively correspond to the plurality of first side coils 14311 and the plurality of second side coils 14312. Two permanent magnets correspond to the second direction coil group 1432.

Figure 9:
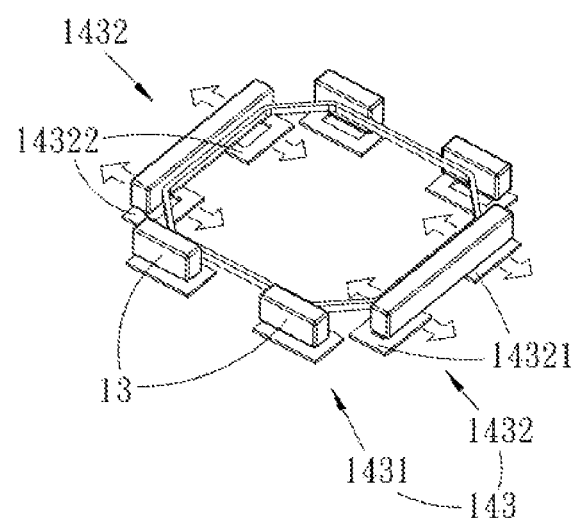
FIG. 9 is a perspective view of a driving mechanism of a camera assembly of the third embodiment of the present disclosure.

FIG. 9 is a perspective view of a driving mechanism of a camera assembly of the third embodiment of the present disclosure. As shown in the figure, the difference between this embodiment and the first embodiment of the driving structure lies in the second direction coil group 1432. The second direction coil group 1432 further comprises a plurality of first side coils 14321 and a plurality of second side coils 14322. The number of the second direction coil groups 1432 is the same as the number of the first direction coil groups 1431. In this way, the horizontal displacement or rotation of the light sensing component 14 can be adjusted precisely according to the direction of electric current applied to the first direction coil group 1431 and the second direction coil group 1432, so as to perform an accurate light compensation for the light sensing member 141.

In this embodiment, the number of the magnetic components 13, the number of the first direction coil groups 1431, and the number of the second direction coil groups 1432 can be adjusted according to requirements. Thus, the light sensing member 141 can be adjusted for light compensation.

Figure 10:
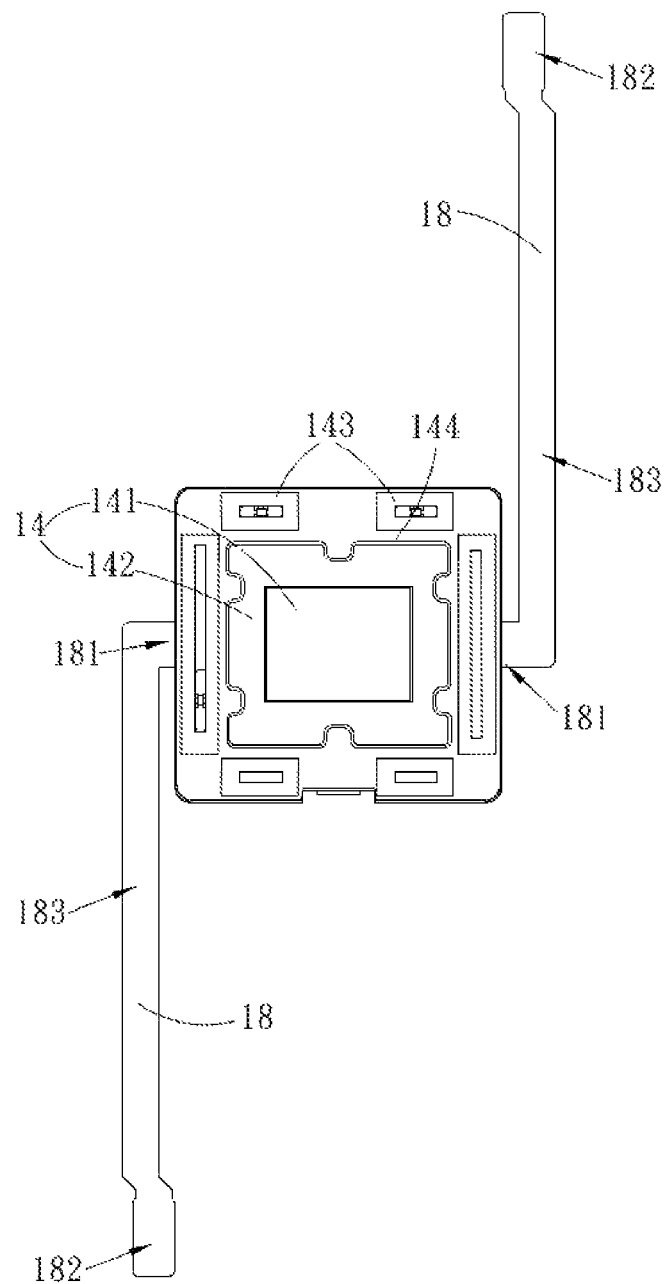
FIG. 10 is a structural diagram of a flexible circuit board of a camera assembly of the first embodiment of the present disclosure.
Figure 11:
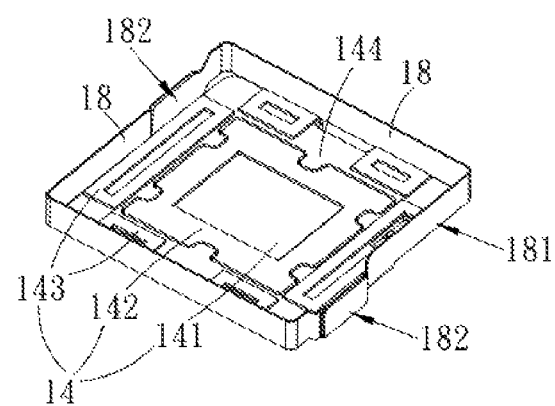
FIG. 11 is a perspective view of the flexible circuit board of the camera assembly of the first embodiment of the present disclosure.
Figure 12:
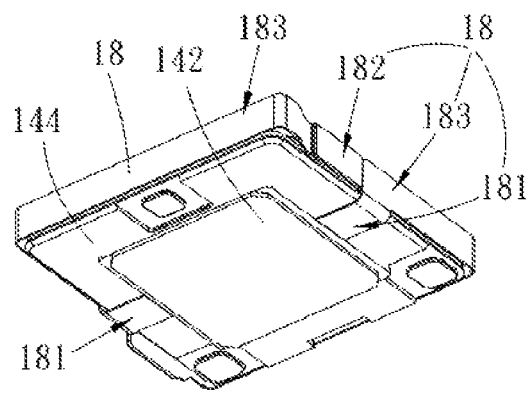
FIG. 12 is another perspective view of the flexible circuit board of the camera assembly of the first embodiment of the present disclosure.

FIG. 10 to FIG. 12 are structural diagram and perspective views of a flexible circuit board of a camera assembly of the first embodiment of the present disclosure. As shown in the figures, in this embodiment, the camera assembly 1 further comprises a flexible circuit board 18, which comprises a first end part 181, a second end part 182, and a body part 183 disposed between the first end part 181 and the second end part 182. The first end part 181 of the flexible circuit board 18 is connected to a side of the baseplate 142, and the body part 183 of the flexible circuit board 18 surrounds the periphery of the light sensing component 14. In this embodiment, the flexible circuit board 18 is disposed on the periphery of the light sensing component 14, which makes the moving range of the light sensing component 14 not limited by the circuit configuration of the flexible circuit board 18. In the case of horizontal displacement or rotation of the light sensing component 14, since the flexible circuit board 18 is disposed on the periphery of the light sensing component 14, the flexible circuit board 18 could provide an appropriate space for the light sensing component 14 for displacement.

In this embodiment, the number of the flexible circuit boards 18 is two. The first end parts of the two flexible circuit boards 18 are connected to two opposite sides of the baseplate 142 and extend below the carrying board 15 to two sides of the carrying board 15. The body parts of the two flexible circuit boards 18 are winding upward from two sides of the carrying board 15. When the body parts of the two flexible circuit boards 18 extend vertically upward relative to a surface of the baseplate 142, they would extend along the periphery of the light sensing component 14 in opposite directions and would connect to the second end part (see FIG. 11 and FIG. 12).

Figure 13:
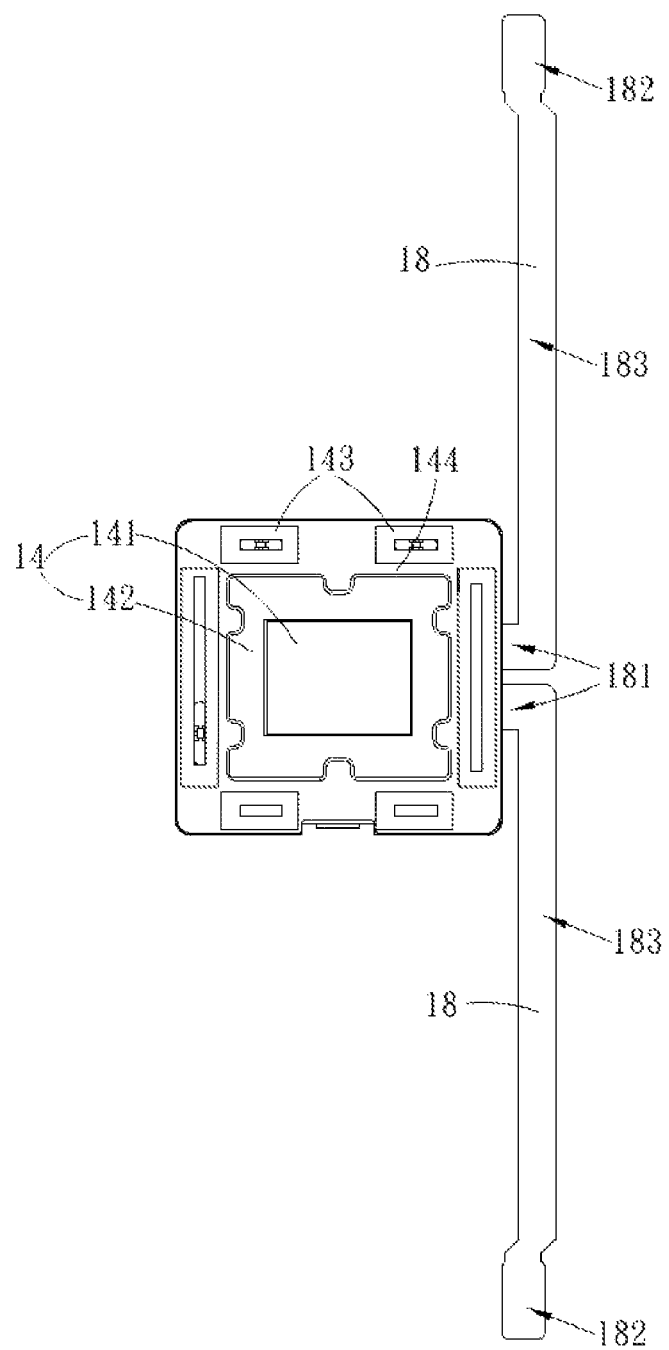
FIG. 13 is a structural diagram of a flexible circuit board of a camera assembly of the second embodiment of the present disclosure.
Figure 14:
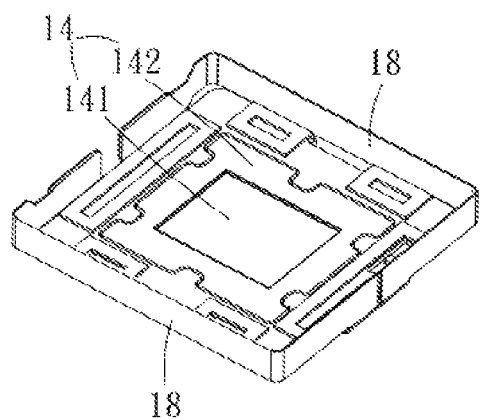
FIG. 14 is a perspective view of the flexible circuit board of the camera assembly of the second embodiment of the present disclosure.
Figure 15:
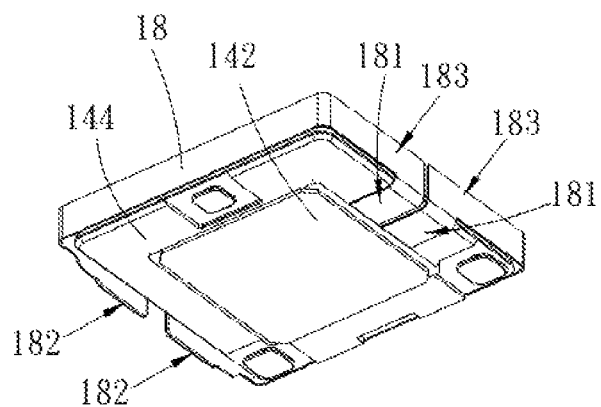
FIG. 15 is another perspective view of the flexible circuit board of the camera assembly of the second embodiment of the present disclosure.

FIG. 13 to FIG. 15 are structural diagram and perspective views of a flexible circuit board of a camera assembly of the second embodiment of the present disclosure. As shown in the figures, the difference between this embodiment and the first embodiment of the flexible circuit board lies in the arrangement of the flexible circuit board 18. The number of the flexible circuit boards 18 is also two. The first end parts 181 of the two flexible circuit boards 18 are connected to the same side of the baseplate 142 and extend below the carrying board 15 to the same side of the carrying board 15. The body parts 183 of the two flexible circuit boards 18 are wining upward from the same side of the carrying board 15. When the body parts 183 of the two flexible circuit boards 18 extend upward vertical to a surface of the baseplate 142, they would extend along the periphery of the light sensing component 14 in opposite directions and would connect to the second end part 182.

Back to FIG. 3 and FIG. 4, in some embodiments, the first end parts 181 of the two flexible circuit boards 18 are disposed parallel to the surface of the baseplate 142, the body parts of the two flexible circuit boards 18 183 are disposed perpendicular to the surface of the baseplate 142, and the second end parts 182 of the two flexible circuit boards 18 are disposed perpendicular to the surface of the baseplate 142. In some embodiments, the body parts of the two flexible circuit boards 18 are disposed between the housing 111 and the light sensing component 14, on the X-Y plane. The second end parts 182 of the two flexible circuit boards 18 are exposed from the housing 111. In some embodiments, the housing 111 comprises two notches 1110, from which the second end parts 182 of the two flexible circuit boards 18 are exposed. In some embodiments, the base 112 comprises two securing sidewalls 1123, which extend vertically upward from the sides of the base 112 and are disposed corresponding to the two notches 1110. The second end parts 182 of the two flexible circuit boards 18 are disposed on the two securing sidewalls 1123 and are exposed from the two notches 1110.

Figure 16:
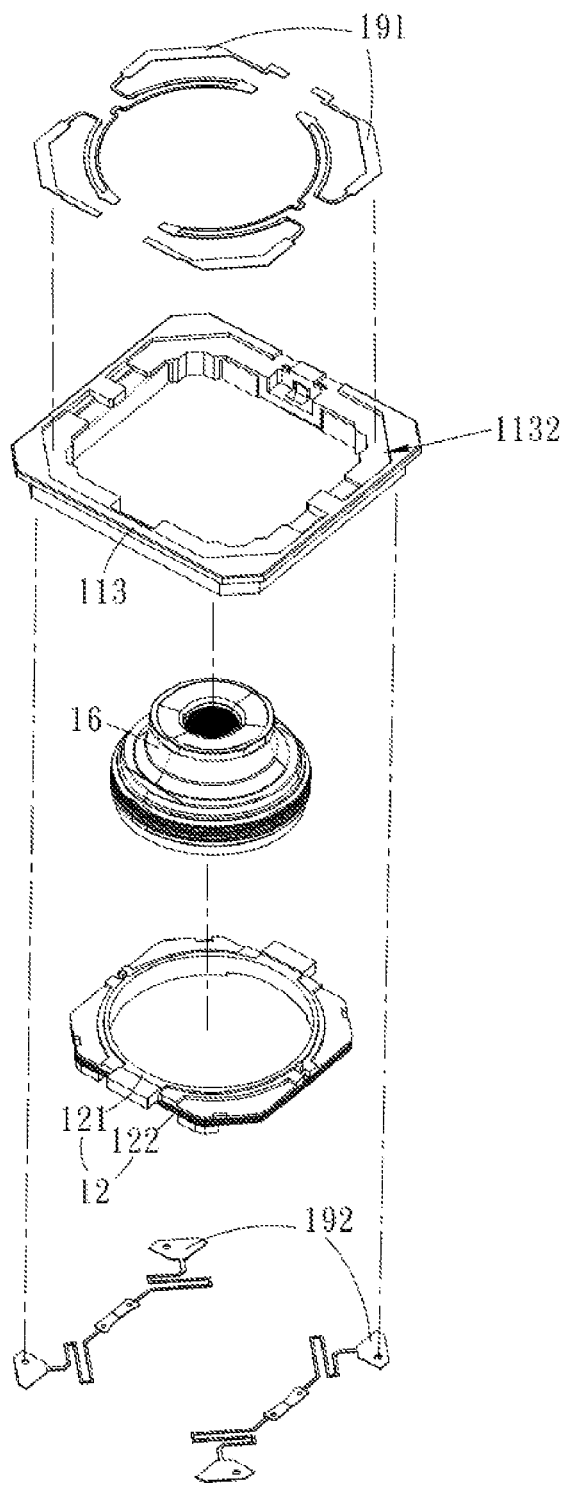
FIG. 16 is an exploded view of inner components of a camera assembly of the present disclosure.
Figure 17:
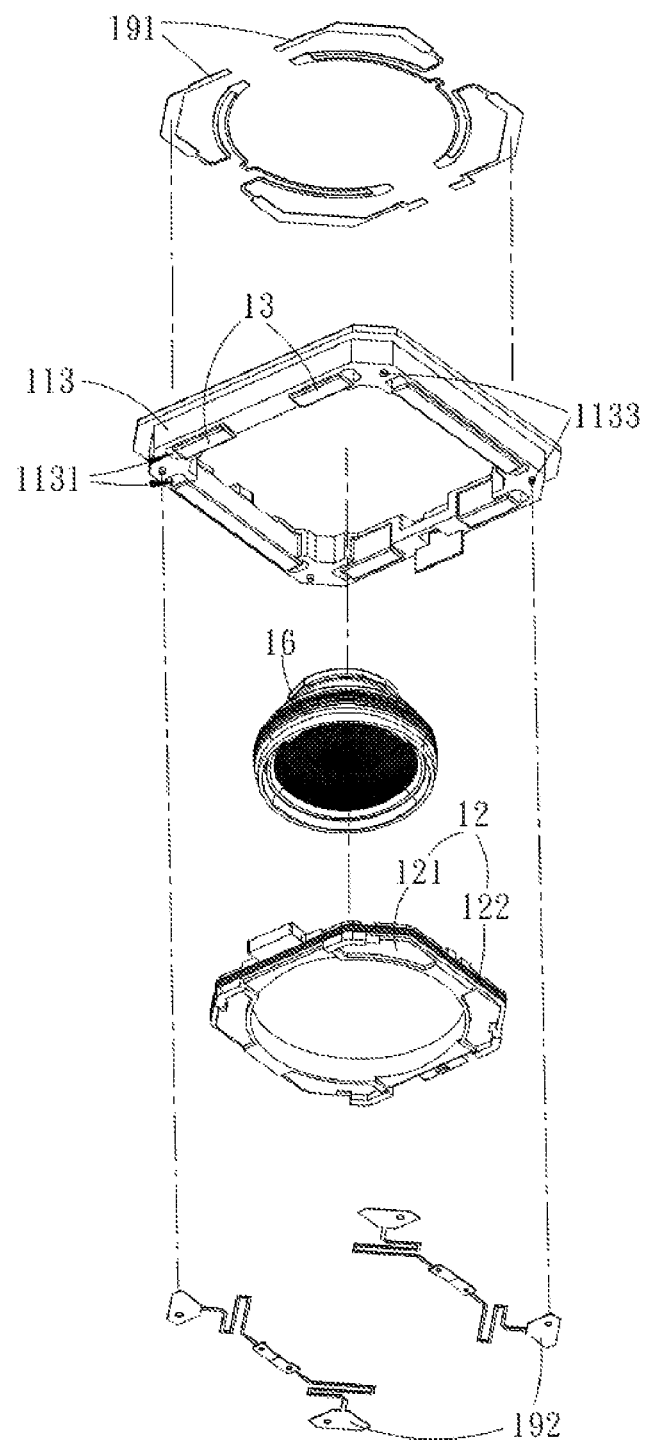
FIG. 17 is another exploded view of inner components of a camera assembly of the present disclosure.

FIG. 16 and FIG. 17 are exploded views of inner components of a camera assembly of the present disclosure. As shown in the figures, in this embodiment, the casing 11 further comprises a holder 113 disposed inside the housing 111. The holder 113 comprises a plurality of recesses 1131. The magnetic component 13 is disposed in the plurality of recesses 1131 of the holder 113. The holder 113 surrounds the carrying component 12. The camera assembly 1 further comprises a first spring member 191 and a second spring member 192. An upper surface of the holder 113 comprises an accommodating recess 1132, and the periphery of a lower surface of the holder 113 comprises a securing column 1133. The first spring member 191 is disposed in the accommodating recess 1132 of the holder 113 and is disposed between the holder 113 and the housing 111. The second spring member 192 is disposed at the securing column 1133 of the holder 113 and is disposed around the light sensing member 141. Wherein, an inner side of the first spring member 191 abuts against the periphery on the top of the lens component 16, and an inner side of the second spring member 192 supports the periphery on the bottom of the lens component 16. When the lens component 16 is driven by the carrying body 121, the first spring member 191 and the second spring member 192 would maintain the balance of the lens component 16 during movement. Meanwhile, the first spring member 191 and the second spring member 192 could be used as electrical circuits providing transmission of power or signal. Besides, the flexible circuit board 18 surrounding the light sensing component 14 is disposed in the gap between the housing 111 and the holder 113, so as to limit the circuit path of the flexible circuit board 18.

In summary, embodiments of the present disclosure provide a camera assembly designed with a combination of a driving mechanism for focusing system with a driving mechanism for optical image stabilization system, the first coil of the carrying component and the second coil of the light sensing component could jointly correspond to the magnetic field of the magnetic component, so as to minimize the volume of the device by reducing the space occupied in the casing, and also to reduce the total cost.

It is to be understood that the term "comprises", "comprising", or any other variants thereof, is intended to encompass a non-exclusive inclusion, such that a process, method, article, or device of a series of elements not only comprise those elements but further comprises other elements that are not explicitly listed, or elements that are inherent to such a process, method, article, or device. An element defined by the phrase "comprising a . . . " does not exclude the presence of the same element in the process, method, article, or device that comprises the element.

Although the present disclosure has been explained in relation to its preferred embodiment, it does not intend to limit the present disclosure. It will be apparent to those skilled in the art having regard to this present disclosure that other modifications of the exemplary embodiments beyond those embodiments specifically described here may be made without departing from the spirit of the disclosure. Accordingly, such modifications are considered within the scope of the disclosure as limited solely by the appended claims.

What is claimed is:

1. A camera assembly, comprising:
   a casing comprising a lens accommodating groove, a housing, and a base, the housing being disposed on the base, the lens accommodating groove being disposed between the housing and the base, an opening of the lens accommodating groove being disposed at the housing, wherein the casing further comprises a holder disposed at an inner side of the housing;
   a carrying component comprising a carrying body and a first coil, the first coil being disposed on a periphery of the carrying body, the carrying component being assembled in the lens accommodating groove, wherein the holder surrounds the carrying component;
   a magnetic component disposed on a periphery of the first coil and on an inner wall of the lens accommodating groove, wherein the magnetic component is disposed at the holder;
   a light sensing component comprising a light sensing member, a baseplate, and a second coil, the light sensing member being disposed on the baseplate, the second coil being disposed around the light sensing member and below the magnetic component;
   a carrying board disposed under the light sensing component and slidably disposed on the base; and
   a first spring member and a second spring member, an upper surface of the holder comprising an accommodating recess, a circumference of a lower surface of the holder comprising a securing column, the first spring member being disposed in the accommodating recess of the holder, an inner side of the first spring member abutting against a top part of the carrying body, the first spring member being disposed between the holder and the housing, the second spring member being disposed at the securing column of the holder, an inner side of the second spring member supporting a bottom side of the carrying body, the second spring member being disposed around the light sensing member.

2. The camera assembly according to claim 1, wherein the number of the second coils is multiple; the plurality of second coils comprise a first direction coil group and a second direction coil group; the first direction coil group is disposed on two opposite sides of the light sensing member; the second direction coil group is disposed on another two opposite sides of the light sensing member.

3. The camera assembly according to claim 2, wherein the magnetic component comprises a first direction magnet group and a second direction magnet group; the first direction magnet group is disposed above the first direction coil group; the second direction magnet group is disposed above the second direction coil group.

4. The camera assembly according to claim 2, wherein the first direction coil group comprises a plurality of first side coils and a plurality of second side coils; the plurality of first side coils are disposed on a side of the light sensing member; the plurality of second side coils are disposed on another side of the light sensing member opposite to the side where the plurality of first side coils are disposed.

5. The camera assembly according to claim 4, wherein the magnetic component comprises a first direction magnet group and a second direction magnet group; the first direction magnet group comprises a plurality of first side magnets and a plurality of second side magnets; the plurality of first side magnets are respectively disposed above the plurality of first side coils; the plurality of second side magnets are respectively disposed above the plurality of second side coils; the second direction magnet group is disposed above the second direction coil group.

6. The camera assembly according to claim 4, wherein the plurality of first side coils and the plurality of second side coils are configured to adjust a horizontal rotation of the light sensing component according to the direction of an applied electric current.

7. The camera assembly according to claim 1, wherein the number of the second coils is multiple; the plurality of second coils comprise a first direction coil group; the first direction coil group is disposed on two opposite sides of the light sensing member; the first direction coil group comprises a plurality of first side coils and a plurality of second side coils; the plurality of first side coils are disposed on a side of the light sensing member; the plurality of second side coils are disposed on another side of the light sensing member opposite to the side where the plurality of first side coils are disposed.

8. The camera assembly according to claim 1, wherein the base comprises a plurality of recesses and a plurality of balls slidably disposed in the plurality of recesses; a bottom surface of the carrying board is in contact with the plurality of balls.

9. The camera assembly according to claim 8, wherein the bottom surface of the carrying board comprises a plurality of bumps extended into the plurality of recesses; a thickness of each of the bumps is smaller than a depth of each of the recesses; an outer diameter of each of the bumps is smaller than a diameter of an opening of each of the recesses; the plurality of balls are respectively disposed between the corresponding recesses and the corresponding bumps.

10. The camera assembly according to claim 1, further comprising a plurality of first magnetic members and a plurality of second magnetic members, the plurality of first magnetic members being disposed on the base, the plurality of second magnetic members being disposed on the carrying board in a position corresponding to the positions of the plurality of first magnetic members, the plurality of first magnetic members and the plurality of second magnetic members being mutually attracted.

11. The camera assembly according to claim 1, further comprising a flexible circuit board, the flexible circuit board comprising a first end part, a second end part, and a body part disposed between the first end part and the second end part, the first end part being connected to a side of the baseplate, the body part surrounding a periphery of the light sensing component, the second end part being disposed at a side of the light sensing component.

12. The camera assembly according to claim 11, wherein the first end part of the flexible circuit board is disposed parallel to the surface of the baseplate; the body part and the second end part of the flexible circuit board are disposed vertical to the surface of the baseplate.

13. The camera assembly according to claim 12, wherein the number of the flexible circuit boards is two; the first end parts of the two flexible circuit boards are connected to two opposite sides of the baseplate; the body parts of the two flexible circuit boards extend vertically upward relative to a surface of the baseplate, and the body parts of the two flexible circuit boards extend in opposite directions along the periphery of the light sensing component; the body parts of the two flexible circuit boards are disposed at the periphery of the light sensing component and are connected to the second end parts.

14. The camera assembly according to claim 13, wherein the first end part of the flexible circuit board is disposed parallel to the surface of the baseplate; the body part and the second end part of the flexible circuit board are disposed vertical to the surface of the baseplate.

15. The camera assembly according to claim 12, wherein the number of the flexible circuit boards is two; the first end parts of the two flexible circuit boards are connected to the same side of the baseplate; the body parts of the two flexible circuit boards extend vertically upward relative to a surface of the baseplate, and the body parts of the two flexible circuit boards extend in opposite directions along the periphery of the light sensing component and are connected to the second end parts.

16. The camera assembly according to claim 15, wherein the first end part of the flexible circuit board is disposed parallel to the surface of the baseplate; the body part and the second end part of the flexible circuit board are disposed vertical to the surface of the baseplate.

17. The camera assembly according to claim 1, further comprising a lens component, the lens component being assembled to the carrying body and being disposed in the lens accommodating groove.

\* \* \* \* \*